(12) United States Patent
Yamazaki et al.

(10) Patent No.: US 10,290,857 B2
(45) Date of Patent: May 14, 2019

(54) POSITIVE ELECTRODE MIXTURE PASTE, POSITIVE ELECTRODE, NONAQUEOUS ELECTROLYTE SECONDARY BATTERY, AND MANUFACTURING METHOD OF NONAQUEOUS ELECTROLYTE SECONDARY BATTERY

(71) Applicant: TOYOTA JIDOSHA KABUSHIKI KAISHA, Toyota-shi, Aichi-ken (JP)

(72) Inventors: Nobuyuki Yamazaki, Toyota (JP); Masanori Kitayoshi, Toyota (JP); Takashi Miura, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 14/885,062

(22) Filed: Oct. 16, 2015

(65) Prior Publication Data

US 2016/0111713 A1  Apr. 21, 2016

(30) Foreign Application Priority Data

Oct. 17, 2014  (JP) ................ 2014-212448

(51) Int. Cl.
| | |
|---|---|
| *H01M 4/136* | (2010.01) |
| *H01M 4/131* | (2010.01) |
| *H01M 4/505* | (2010.01) |
| *H01M 4/525* | (2010.01) |
| *H01M 4/04* | (2006.01) |
| *H01M 4/58* | (2010.01) |
| *H01M 4/62* | (2006.01) |
| *H01M 10/04* | (2006.01) |
| *H01M 4/13* | (2010.01) |
| *H01M 10/052* | (2010.01) |
| *H01M 4/02* | (2006.01) |

(52) U.S. Cl.
CPC ......... *H01M 4/136* (2013.01); *H01M 4/0404* (2013.01); *H01M 4/13* (2013.01); *H01M 4/131* (2013.01); *H01M 4/505* (2013.01); *H01M 4/525* (2013.01); *H01M 4/5825* (2013.01); *H01M 4/62* (2013.01); *H01M 4/623* (2013.01); *H01M 10/04* (2013.01); *H01M 10/052* (2013.01); *H01M 2004/028* (2013.01)

(58) Field of Classification Search
None
See application file for complete search history.

(56) References Cited

U.S. PATENT DOCUMENTS

| | | | |
|---|---|---|---|
| 2008/0261117 A1 | 10/2008 | Iwanaga et al. | |
| 2011/0104557 A1 | 5/2011 | Watanabe et al. | |
| 2013/0219703 A1 | 8/2013 | Mitsuhashi | |
| 2014/0252268 A1 | 9/2014 | Kagei et al. | |
| 2015/0188140 A1* | 7/2015 | Kose | H01M 4/0404 427/58 |
| 2016/0190585 A1* | 6/2016 | Yoon | H01M 4/485 429/231.5 |

FOREIGN PATENT DOCUMENTS

| | | |
|---|---|---|
| EP | 2413402 A1 | 2/2012 |
| EP | 2631972 A1 | 8/2013 |
| JP | 2008-243810 A | 10/2008 |
| JP | 2010040383 A | 2/2010 |
| JP | 2010-267501 A | 11/2010 |
| JP | 2013-175325 A | 9/2013 |
| JP | 2014-103098 A | 6/2014 |
| JP | 5572268 B1 | 8/2014 |
| WO | 2014/064513 A1 | 5/2014 |

OTHER PUBLICATIONS

Santhanam, "Research progress in high voltage spinel LiNi0.5Mn1.5O4 material", Journal of Power Sources 195 (2010) 5442-5451.*

\* cited by examiner

*Primary Examiner* — Ladan Mohaddes
(74) *Attorney, Agent, or Firm* — Sughrue Mion, PLLC

(57) ABSTRACT

In a positive electrode mixture paste manufacturing step, a positive electrode mixture paste is manufactured by further mixing an acid compound, in addition to a positive-electrode active material, a conductive material, a binder, lithium phosphate, and a solvent.

9 Claims, 6 Drawing Sheets

POSITIVE ELECTRODE MIXTURE PASTE, POSITIVE ELECTRODE, NONAQUEOUS ELECTROLYTE SECONDARY BATTERY, AND MANUFACTURING METHOD OF NONAQUEOUS ELECTROLYTE SECONDARY BATTERY

INCORPORATION BY REFERENCE

The disclosure of Japanese Patent Application No. 2014-212448 filed on Oct. 17, 2014 including the specification, drawings and abstract is incorporated herein by reference in its entirety.

BACKGROUND OF THE INVENTION

1. Field of the Invention

The present invention relates to a positive electrode mixture paste, a positive electrode, a nonaqueous electrolyte secondary battery, and a manufacturing method of a nonaqueous electrolyte secondary battery.

2. Description of Related Art

Conventionally, there has been known a nonaqueous electrolyte secondary battery including a positive-electrode active material (e.g., a lithium nickel manganese oxide having a spinel structure) having an operation upper limit potential of 4.35 V or more on the metal lithium basis. In the nonaqueous electrolyte secondary battery, when a potential of the positive-electrode active material (equivalent to a potential of a positive electrode) reaches 4.35 V or more by performing initial charge or the like, a solvent in a nonaqueous electrolyte is decomposed by oxidation on a surface of the positive-electrode active material, so that hydrogen ions generated hereby are reacted with fluorine ions in the nonaqueous electrolyte, which might generate hydrofluoric acid (HF). Due to an action of the hydrofluoric acid, transition metals in the positive-electrode active material are eluted, which might decrease battery performance.

In this regard, Japanese Patent Application Publication No. 2014-103098 (JP 2014-103098 A) describes a technique in which lithium phosphate is contained in a positive electrode mixture layer, so that hydrofluoric acid generated as described above is reacted with lithium phosphate ($Li_3PO_4$) so that the hydrofluoric acid is reduced, thereby reducing elution of transition metals in a positive-electrode active material. More specifically, in JP 2014-103098 A, the positive-electrode active material, a conductive material, a binder, and lithium phosphate, and a solvent are kneaded (stirred), so as to manufacture a positive electrode mixture paste. Then, the positive electrode mixture paste thus manufactured is applied to a power collection member and then dried, so as to manufacture a positive electrode including a positive electrode mixture layer containing lithium phosphate.

However, in the manufacturing method described in JP 2014-103098 A, a good dispersion degree of lithium phosphate in the positive electrode mixture layer might not be obtained. More specifically, when the positive electrode mixture paste is manufactured, for example, lithium phosphate is aggregated (or aggregated lithium phosphate cannot be separated), which decreases dispersibility of lithium phosphate in the positive electrode mixture paste, thereby resulting in that a dispersion degree of lithium phosphate in the positive electrode mixture layer might be lowered. Note that, if a kneading (stirring) energy of the positive electrode mixture paste is raised in order to raise dispersibility of lithium phosphate, the positive-electrode active material is broken. For this reason, any method that increases a kneading (stirring) energy so as to raise the dispersibility of lithium phosphate cannot be employed.

If a dispersion degree of lithium phosphate in the positive electrode mixture layer is not good (lithium phosphate is not uniformly dispersed in the positive electrode mixture layer to some extent), lithium phosphate cannot be appropriately reacted with hydrofluoric acid generated on surfaces of many positive-electrode active materials dispersed in the whole positive electrode mixture layer, which might not be able to prevent elution of transition metals in the positive-electrode active material appropriately.

SUMMARY OF THE INVENTION

The present invention provides a manufacturing method of a nonaqueous electrolyte secondary battery that can achieve a good dispersion degree of lithium phosphate in a positive electrode mixture layer, a positive electrode mixture paste having good dispersibility of lithium phosphate, a positive electrode having a good dispersion degree of lithium phosphate in a positive electrode mixture layer, and a nonaqueous electrolyte secondary battery including the positive electrode.

A first aspect of the present invention relates to a manufacturing method of a nonaqueous electrolyte secondary battery. The manufacturing method comprises manufacturing a positive electrode mixture paste by kneading a positive-electrode active material having an operation upper limit potential of 4.35 V or more on a metallic lithium basis, a conductive material, a binder, lithium phosphate, a solvent, and an acid compound; manufacturing a positive electrode including a positive electrode mixture layer on a surface of a current collector member, by applying the positive electrode mixture paste to the surface of the current collector member and drying the positive electrode mixture paste; assembling the nonaqueous electrolyte secondary battery by accommodating, in a battery case, the positive electrode, a negative electrode, and a nonaqueous electrolyte containing a compound having fluorine element; and performing initial charge on the nonaqueous electrolyte secondary battery.

The abovementioned manufacturing method is a manufacturing method of a nonaqueous electrolyte secondary battery in which the operation upper limit potential of the positive-electrode active material (that is, an operation upper limit potential of the positive electrode) is 4.35 V or more on the metallic lithium basis. Further, in the manufacturing method, in the positive electrode mixture paste manufacturing step, the positive electrode mixture paste is manufactured by further mixing the acid compound, in addition to the positive-electrode active material, the conductive material, the binder, the lithium phosphate, and the solvent.

Thus, by adding the acid compound to the positive electrode mixture paste, at least part of the lithium phosphate can be dissolved in the positive electrode mixture paste by the acid compound. When at least part of the lithium phosphate is dissolved in the positive electrode mixture paste as such, good dispersibility of the lithium phosphate in the positive electrode mixture paste can be obtained. As a result, a good dispersion degree of the lithium phosphate can be achieved in the positive electrode mixture layer formed by drying the positive electrode mixture paste.

Accordingly, in the step of performing initial charge on the nonaqueous electrolyte secondary battery, "when the potential of the positive-electrode active material (equivalent to the potential of the positive electrode) reaches 4.35 V or more, so that the solvent in the nonaqueous electrolyte is decomposed by oxidation on a surface of the positive-electrode active material and hydrogen ions generated hereby are reacted with fluorine ions in the nonaqueous electrolyte so as to generate hydrofluoric acid (HF)," a probability that the hydrofluoric acid thus generated is reacted with the lithium phosphate is increased, thereby making it possible to effectively reduce the hydrofluoric acid thus generated. As a result, it is possible to reduce elution of transition metals in the positive-electrode active material due to an action of the hydrofluoric acid. Note that, in a case where the hydrofluoric acid thus generated cannot be reacted with the lithium phosphate on the surface of the positive-electrode active material, the hydrofluoric acid migrates to the negative electrode and generates hydrogen gas.

Further, due to the reaction between the hydrofluoric acid and the lithium phosphate on the surface of the positive-electrode active material, a protective coating (which is presumably a coating in which a compound having elemental fluorine is mixed with a compound having elemental phosphorus) is formed on the surface of the positive-electrode active material. In the above manufacturing method, a good dispersion degree (degree of dispersion) of the lithium phosphate in the positive electrode mixture layer can be obtained, so that the protective coating is easily formed on the surface of each positive-electrode active material in the positive electrode mixture layer. Since the protective surface film is formed, in a case where the battery is charged subsequently until the potential of the positive-electrode active material (equivalent to the potential of the positive electrode) reaches 4.35 V or more, it is possible to restrain the solvent of the nonaqueous electrolyte from being decomposed by oxidation on the surface of the positive-electrode active material.

Further, the "positive-electrode active material in which the operation upper limit potential is 4.35 V or more on the metallic lithium basis" indicates a positive-electrode active material in which the oxidation-reduction potential (an operation potential) of the positive-electrode active material is 4.35 V (vs. Li/Li$^+$) or more within a range in which an SOC (State of Charge) of the nonaqueous electrolyte secondary battery manufactured by the above manufacturing method is 0% to 100%. The nonaqueous electrolyte secondary battery containing the positive-electrode active material has a region where the potential of the positive electrode (equivalent to the potential of the positive-electrode active material) reaches 4.35V (vs. Li/Li$^+$) or more within the range where the SOC is 0% to 100%. For example, as the positive-electrode active material, a lithium nickel manganese oxide having a spinel structure can be used. Further, a lithium transition metal phosphate compound having an olivine structure of LiMnPO$_4$, LiNiPO$_4$, or LiCoPO$_4$ can be also used. Note that the lithium transition metal phosphate compound of LiMnPO$_4$ is a compound in which a basic composition is represented by LiMnPO$_4$, and includes a compound in which part of Mn (less than 50%) is replaced with other transition metals, as well as LiMnPO$_4$. Further, the lithium transition metal phosphate compound of LiNiPO$_4$ is a compound in which a basic composition is represented by LiNiPO$_4$, and includes a compound in which part of Ni (less than 50%) is replaced with other transition metals, as well as LiNiPO$_4$. Further, the lithium transition metal phosphate compound of LiCoPO$_4$ is a compound in which a basic composition is represented by LiCoPO$_4$, and includes a compound in which part of Co (less than 50%) is replaced with other transition metals, as well as LiCoPO$_4$.

Further, the "acid compound" mixed in the positive electrode mixture paste is not limited particularly, but can include hydrochloric acid, nitric acid, acetic acid, formic acid, boric acid, phosphoric acid, pyrophosphoric acid, metaphosphoric acid, and the like.

Further, the manufacturing method of the nonaqueous electrolyte secondary battery may be a manufacturing method of a nonaqueous electrolyte secondary battery in which the acid compound is an acid compound having elemental phosphorus (P).

In the manufacturing method, the acid compound having elemental phosphorus (P) is used as the acid compound to be mixed in the positive electrode mixture paste. Hereby, the acid compound itself is reacted with hydrofluoric acid, so that the acid compound can contribute to forming a protective surface film on the surface of the positive-electrode active material. This makes it possible to further restrain the solvent of the nonaqueous electrolyte from being decomposed by oxidation on the surface of the positive-electrode active material.

Further, the manufacturing method of the nonaqueous electrolyte secondary battery may be a manufacturing method of a nonaqueous electrolyte secondary battery in which the acid compound having elemental phosphorous is at least any of phosphoric acid, pyrophosphoric acid, and metaphosphoric acid.

In the manufacturing method, as the acid compound to be mixed in the positive electrode mixture paste, at least any of phosphorus acid (H$_3$PO$_4$), pyrophosphoric acid (H$_4$P$_2$O$_7$), and metaphosphoric acid ((HPO$_3$)$_n$) is used. These acid compounds can be reacted with hydrofluoric acid, so as to form a good protective surface film on the surface of the positive-electrode active material. This makes it possible to further restrain the solvent of the nonaqueous electrolyte from being decomposed by oxidation on the surface of the positive-electrode active material.

Further, any of the above manufacturing methods of the nonaqueous electrolyte secondary battery may be a manufacturing method of a nonaqueous electrolyte secondary battery in which the positive-electrode active material is a lithium nickel manganese oxide having a spinel structure.

In the manufacturing method, the lithium nickel manganese oxide having a spinel structure is used as the positive-electrode active material. The positive-electrode active material is preferable as a positive-electrode active material in which an operation upper limit potential is 4.35 V or more on the metallic lithium basis. More specifically, even if the potential of the positive-electrode active material reaches 4.35 V or more on the metallic lithium basis, its crystal structure is stable. In view of this, with the use of the positive-electrode active material, it is possible to obtain a nonaqueous electrolyte secondary battery that can sufficiently endure such usage in which the battery is set to a high voltage.

A second aspect of the present invention relates to a positive electrode mixture paste obtained by further mixing an acid compound in addition to a positive-electrode active material having an operation upper limit potential of 4.35 V or more on the metallic lithium basis, a conductive material, a binder, lithium phosphate, and a solvent.

The abovementioned positive electrode mixture paste is configured such that the acid compound is further mixed in addition to the positive-electrode active material having an operation upper limit potential of 4.35 V or more on the metallic lithium basis, the conductive material, the binder, the lithium phosphate, and the solvent. Thus, by adding the acid compound to the positive electrode mixture paste, at least part of the lithium phosphate can be dissolved in the positive electrode mixture paste by the acid compound.

When at least part of the lithium phosphate is dissolved in the positive electrode mixture paste as such, good dispersibility of the lithium phosphate in the positive electrode mixture paste can be obtained. As a result, a good dispersion degree of the lithium phosphate can be achieved in the positive electrode mixture layer formed by drying the positive electrode mixture paste.

Further, the positive electrode mixture paste may be a positive electrode mixture paste in which the acid compound is an acid compound having elemental phosphorus (P).

The positive electrode mixture paste contains the acid compound having elemental phosphorus (P) as the acid compound to be mixed in the positive electrode mixture paste. On this account, by manufacturing a nonaqueous electrolyte secondary battery with the use of the abovementioned positive electrode mixture paste, the acid compound itself is reacted with hydrofluoric acid, so that the acid compound can contribute to forming a protective surface film on the surface of the positive-electrode active material. This makes it possible to further restrain the solvent of the nonaqueous electrolyte from being decomposed by oxidation on the surface of the positive-electrode active material.

Further, the positive electrode mixture paste may be a positive electrode mixture paste in which the acid compound having phosphorous is at least any of phosphoric acid, pyrophosphoric acid, and metaphosphoric acid.

The abovementioned positive electrode mixture paste includes at least any of phosphorus acid ($H_3PO_4$), pyrophosphoric acid ($H_4P_2O_7$), and metaphosphoric acid (($HPO_3$)$_n$) as the acid compound to be mixed in the positive electrode mixture paste. These acid compounds can be reacted with hydrofluoric acid, so as to form a good protective surface film on the surface of the positive-electrode active material. This makes it possible to further restrain the solvent of the nonaqueous electrolyte from being decomposed by oxidation on the surface of the positive-electrode active material.

Further, any of the above positive electrode mixture pastes may be the positive electrode mixture paste in which the positive-electrode active material is a lithium nickel manganese oxide having a spinel structure.

The positive electrode mixture paste contains the lithium nickel manganese oxide having a spinel structure as the positive-electrode active material. The positive-electrode active material is preferable as a positive-electrode active material in which an operation upper limit potential is 4.35 V or more on the metallic lithium basis. More specifically, even if the potential of the positive-electrode active material reaches 4.35 V or more on the metallic lithium basis, its crystal structure is stable. In view of this, with the use of the positive-electrode active material, it is possible to manufacture a nonaqueous electrolyte secondary battery that can sufficiently endure such usage in which the battery is set to a high voltage.

A third aspect of the present invention relates to a positive electrode including a current collector member, and a positive electrode mixture layer obtained by drying a positive electrode mixture paste applied to the current collector member, and the positive electrode mixture paste is any of the aforementioned positive electrode mixture pastes.

The positive electrode is a positive electrode manufactured by use of any of the aforementioned positive electrode mixture pastes. Such a positive electrode is a positive electrode having a good dispersion degree of lithium phosphate in the positive electrode mixture layer, as described above.

A fourth aspect of the present invention relates to a nonaqueous electrolyte secondary battery including a positive electrode, a negative electrode, and a nonaqueous electrolyte containing a compound having fluorine element (F), and the positive electrode is the positive electrode described above.

The abovementioned nonaqueous electrolyte secondary battery uses the above positive electrode (the positive electrode having a good dispersion degree of lithium phosphate in the positive electrode mixture layer) as the positive electrode. On this account, in the step of performing initial charge on the nonaqueous electrolyte secondary battery, for example, "when the potential of the positive-electrode active material (equivalent to the potential of the positive electrode) reaches 4.35 V or more, so that the solvent in the nonaqueous electrolyte is decomposed by oxidation on the surface of the positive-electrode active material and hydrogen ions generated hereby are reacted with fluorine ions in the nonaqueous electrolyte so as to generate hydrofluoric acid (HF)," a probability that the hydrofluoric acid thus generated is reacted with the lithium phosphate is increased, thereby making it possible to effectively reduce the hydrofluoric acid thus generated. As a result, it is possible to reduce elution of transition metals in the positive-electrode active material due to an action of the hydrofluoric acid.

Further, with the use of the positive electrode (the positive electrode having a good dispersion degree of lithium phosphate in the positive electrode mixture layer) as described above, the aforementioned protective coating is easily formed on the surface of each positive-electrode active material in the positive electrode mixture layer. Since the protective surface film is formed as such, in a case where the battery is charged subsequently until the potential of the positive-electrode active material (equivalent to the potential of the positive electrode) reaches 4.35 V or more, it is possible to restrain the solvent of the nonaqueous electrolyte from being decomposed by oxidation on the surface of the positive-electrode active material.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
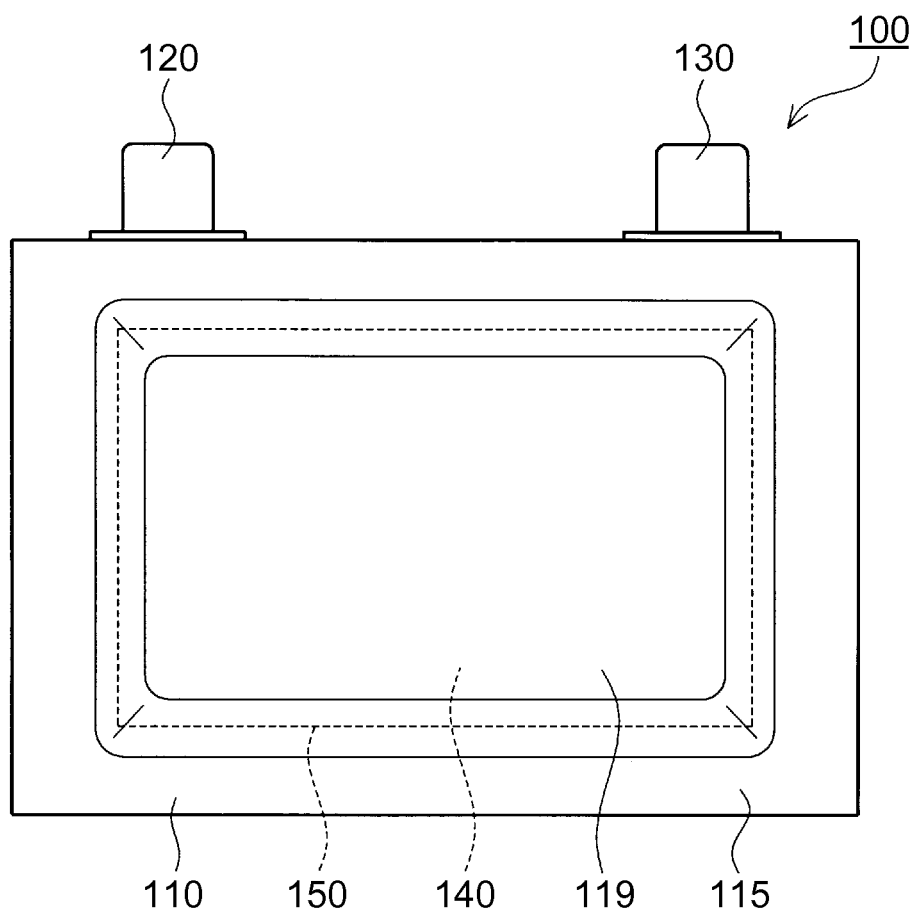
FIG. 1 is a plan view of a nonaqueous electrolyte secondary battery according to an embodiment.

Next will be described an embodiment of the present invention with reference to the drawings. FIG. 1 is a plan view of a nonaqueous electrolyte secondary battery 100 according to the present embodiment. The nonaqueous electrolyte secondary battery 100 of the present embodiment is a lithium ion secondary battery, and includes a battery case 110 having a rectangular shape in a plan view, a positive terminal 120 extending from an inside of the battery case 110 toward its outside, and a negative terminal 130 extending from the inside of the battery case 110 toward its outside, as illustrated in FIG. 1.

Figure 2:
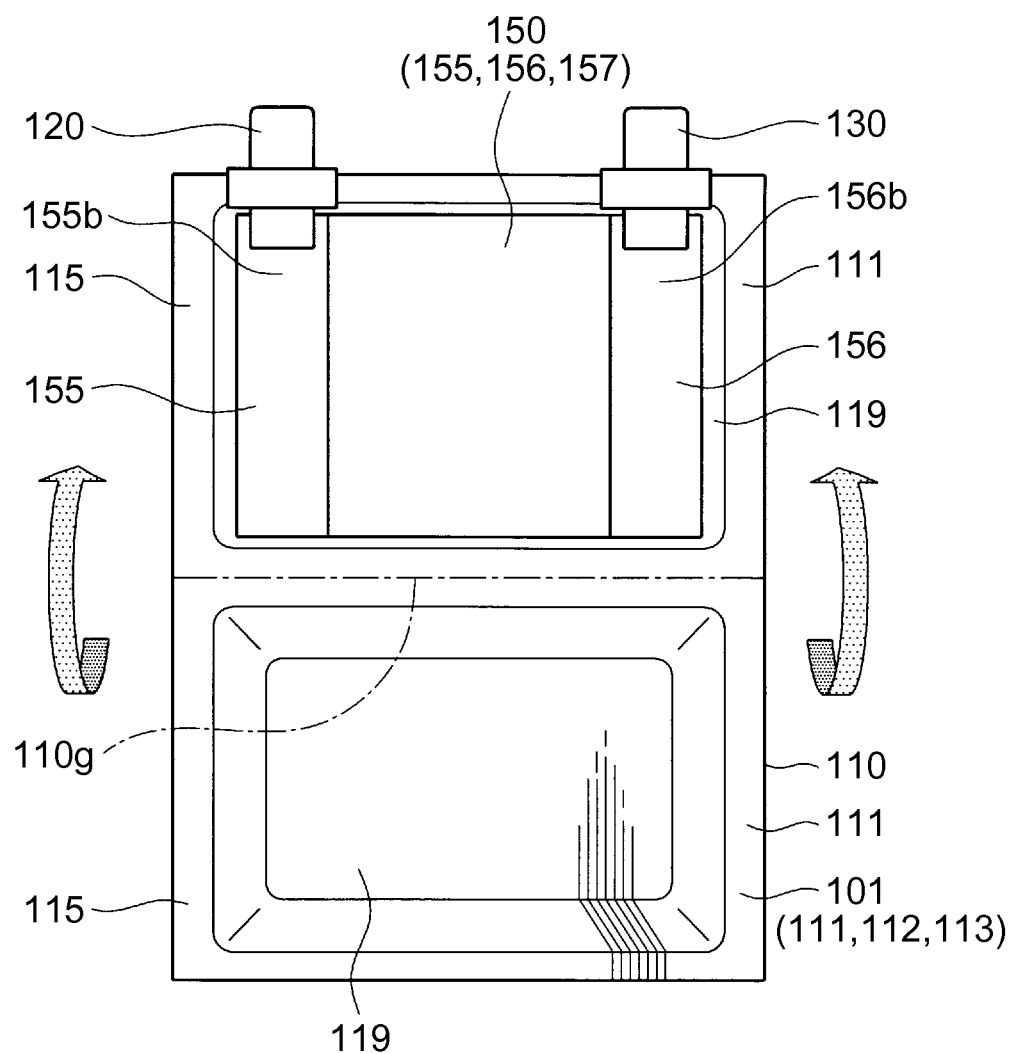
FIG. 2 is a view to describe a manufacturing method of the battery.

The battery case 110 is formed of a laminated film 101 in which an inner resin film 111 placed on an innermost side of the battery case 110, a metal film 112 placed adjacent to an outer side (a deeper side on a plane of paper in FIG. 2) of the inner resin film 111, and an outer resin film 113 placed adjacent to an outer side of the metal film 112 are laminated (see FIG. 2). As illustrated in FIG. 2, the battery case 110 is formed in a rectangular shape in a plan view such that the laminated film 101 in which an electrode body 150 is placed in a receptacle portion 119 is folded at a folding position 110g, and a generally rectangular annular welding sealing portion 115 (a peripheral part of the battery case 110) is sealed by thermal welding as illustrated in FIG. 1.

Further, as illustrated in FIG. 2, the electrode body 150 is accommodated inside the battery case 110. The electrode body 150 is a flat wound body formed by winding a positive electrode 155, a negative electrode 156, and a separator 157 each having an elliptical section and formed in an elongated sheet-shape.

Figure 3:
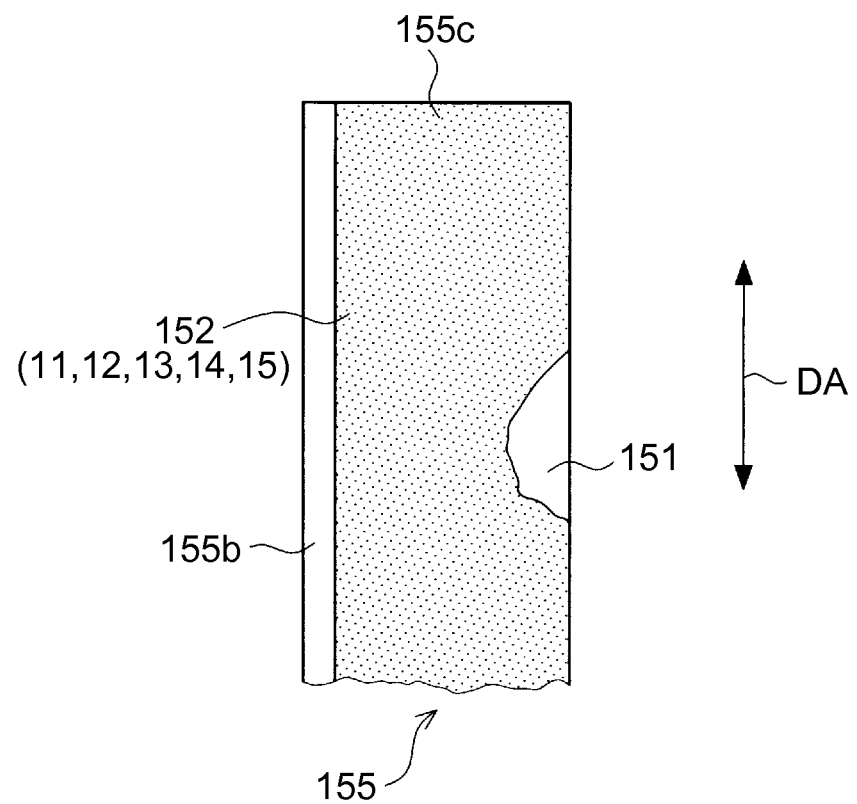
FIG. 3 is a view illustrating a configuration of a positive electrode.

As illustrated in FIG. 3, the positive electrode 155 has a belt shape extending in a longitudinal direction DA, and includes a positive-electrode current collector member 151 made of an aluminum foil, and two positive electrode mixture layers 152 placed on both surfaces of the positive-electrode current collector member 151 so as to have a belt shape extending in the longitudinal direction DA. The positive electrode mixture layer 152 contains a positive-electrode active material 11, a conductive material 12 made of acetylene black, a binder 13 made of PVDF, lithium phosphate 14, and an acid compound 15 made of phosphoric acid.

That part of the positive electrode 155 to which the positive electrode mixture layer 152 is applied is called a positive-electrode-mixture-layer coated part 155c. Meanwhile, that part of the positive electrode 155 which is constituted by only the positive-electrode current collector member 151 without the positive electrode mixture layer 152 is called a positive-electrode-mixture-layer uncoated part 155b. The positive-electrode-mixture-layer uncoated part 155b extends in a belt shape in the longitudinal direction DA of the positive electrode 155 along one long side of the positive electrode 155. The positive-electrode-mixture-layer uncoated part 155b is wound so as to form a spiral shape, and is placed in one end (a left end in FIG. 2) of the electrode body 150 in its axis direction (a right-left direction in FIG. 2). The positive terminal 120 is welded to the positive-electrode-mixture-layer uncoated part 155b.

Note that, in the present embodiment, a lithium nickel manganese oxide (more specifically, $LiNi_{0.5}Mn_{1.5}O_4$) having a spinel structure is used as the positive-electrode active material 11. The positive-electrode active material 11 is a positive-electrode active material having an operation upper limit potential of 4.35 V or more on the metallic lithium basis. That is, the positive-electrode active material 11 is a positive-electrode active material in which an oxidation-reduction potential (an operation potential) of the positive-electrode active material 11 is 4.35 V (vs. $Li/Li^+$) or more within a range where an SOC of the nonaqueous electrolyte secondary battery 100 is 0% to 100%. Accordingly, the nonaqueous electrolyte secondary battery 100 including the positive-electrode active material 11 has a region where a potential of the positive electrode 155 (equivalent to the potential of the positive-electrode active material 11) is 4.35 V (vs. $Li/Li^+$) or more within the range where the SOC is 0% to 100%. In the present embodiment, an average particle diameter of the positive-electrode active material 11 is d50=5 μm. Further, an average particle diameter of the lithium phosphate 14 ($Li_3PO_4$) is d50=3 μm.

Figure 4:
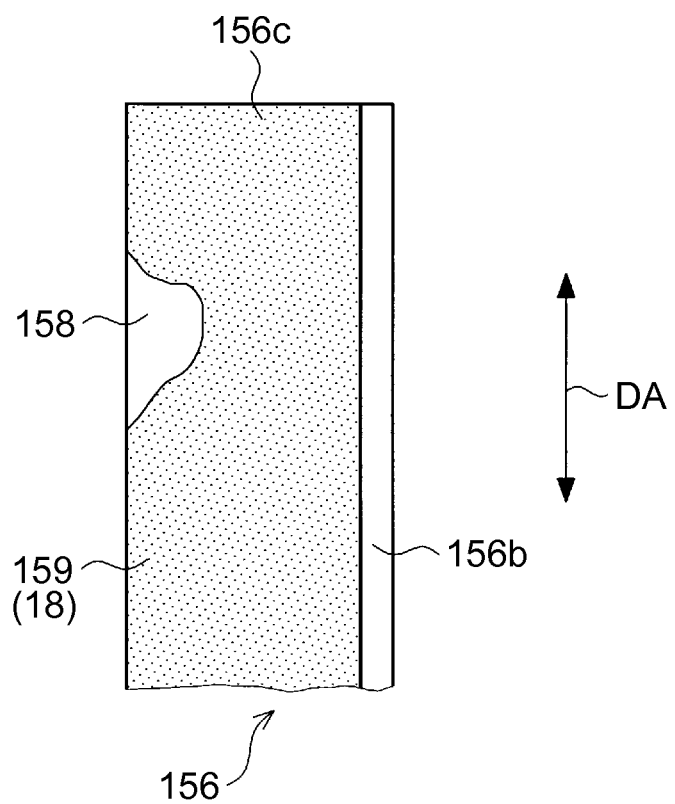
FIG. 4 is a view illustrating a configuration of a negative electrode.

Further, as illustrated in FIG. 4, the negative electrode 156 has a belt shape extending in a longitudinal direction DA, and includes a negative-electrode current collector member 158 made of a copper foil, and two negative electrode mixture layers 159 placed on both surfaces of the negative-electrode current collector member 158 so as to have a belt shape extending in the longitudinal direction DA. The negative electrode mixture layer 159 contains a negative-electrode active material 18, and a binder made of PVDF. Note that, in the present embodiment, a carbon material (more specifically, graphite) is used as the negative-electrode active material 18.

That part of the negative electrode 156 to which the negative electrode mixture layer 159 is applied is called a negative-electrode-mixture-layer coated part 156c. Meanwhile, that part of the negative electrode 156 which is constituted by only the negative-electrode current collector member 158 without the negative electrode mixture layer 159 is called a negative-electrode-mixture-layer uncoated part 156b. The negative-electrode-mixture-layer uncoated part 156b extends in a belt shape in the longitudinal direction DA of the negative electrode 156 along one long side of the negative electrode 156. The negative-electrode-mixture-layer uncoated part 156b is wound so as to form a spiral shape, and is placed in the other end (a right end in FIG. 2) of the electrode body 150 in the axis direction. The negative terminal 130 is welded to the negative-electrode-mixture-layer uncoated part 156b.

The separator 157 is a separator made of a resin film having an electric insulation property. The separator 157 is provided between the positive electrode 155 and the negative electrode 156 so as to separate them from each other. Note that the separator 157 is impregnated with a nonaqueous electrolyte 140.

Further, in the present embodiment, a nonaqueous electrolyte containing a compound having elemental fluorine (F) is used as the nonaqueous electrolyte 140. More specifically, a nonaqueous electrolyte configured such that lithium hexafluorophosphate ($LiPF_6$), which is a compound having elemental fluorine, is dissolved in a nonaqueous solvent in which EC (ethylene carbonate), DMC (dimethyl carbonate), and EMC (ethylmethyl carbonate) are mixed is used.

Figure 5:
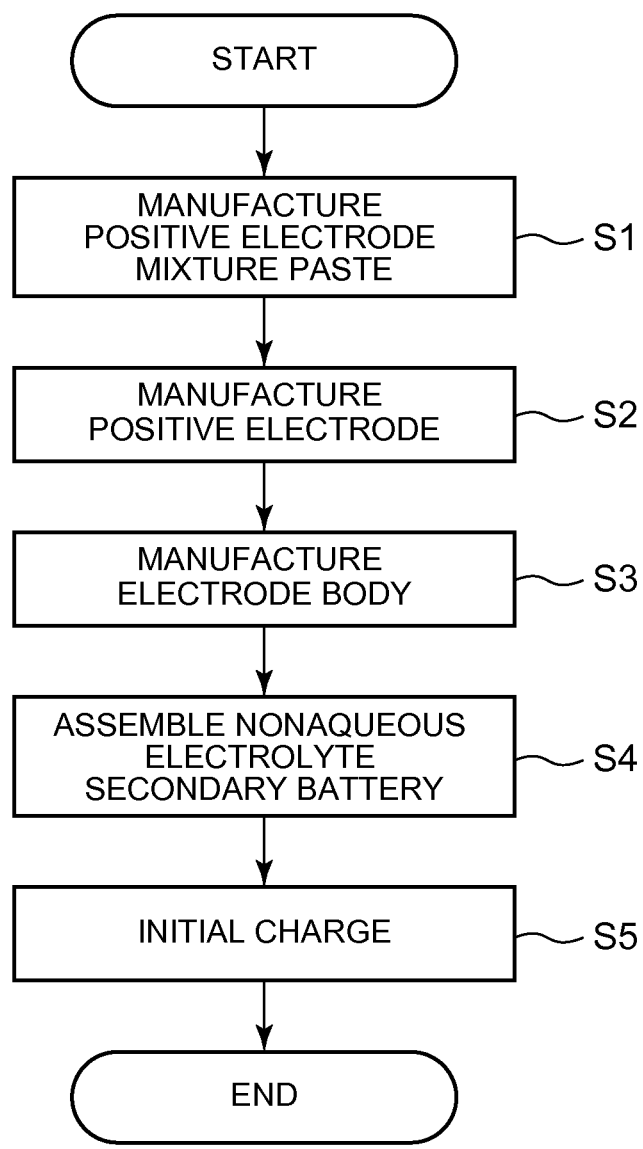
FIG. 5 is a flowchart illustrating a flow of a manufacturing method of a nonaqueous electrolyte secondary battery according to the embodiment.
Figure 6:
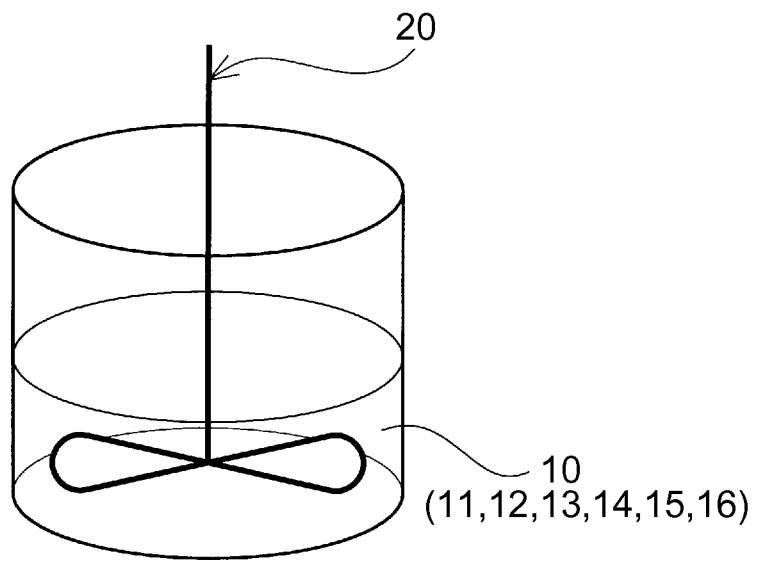
FIG. 6 is a view to describe the manufacturing method of the battery.

Next will be described a manufacturing method of a nonaqueous electrolyte secondary battery according to the present embodiment. FIG. 5 is a flowchart illustrating a flow of a manufacturing method of a nonaqueous electrolyte secondary battery according to the present embodiment. First, in step S1, a positive electrode mixture paste 10 is manufactured. More specifically, as illustrated in FIG. 6, a positive-electrode active material 11 ($LiNi_{0.5}Mn_{1.5}O_4$), a conductive material 12 (acetylene black), a binder 13 (PVDF), lithium phosphate 14, an acid compound 15 (phosphoric acid), a solvent 16 (NMP), and a dispersing agent are kneaded by a high-speed disperser 20, so as to form the positive electrode mixture paste 10. Note that, in the present embodiment, HOMOGENIZING MIXER made by PRIMIX Corporation is used as the high-speed disperser 20. Further, a rotation speed of the high-speed disperser 20 is adjusted within a range of 2000 to 4000 rpm, and the kneading is performed for ten minutes.

Subsequently, the process proceeds to step S2, in which a positive electrode 155 is manufactured. More specifically, the positive electrode mixture paste 10 manufactured as described above is applied to a surface (either side) of a positive-electrode current collector member 151 (an aluminum foil), dried, and then subjected to press working. Hereby, the positive electrode 155 including a positive electrode mixture layer 152 on the surface (either side) of the positive-electrode current collector member 151 is obtained. Note that the positive electrode mixture layer 152 is obtained by drying and pressing (compressing) the positive electrode mixture paste 10.

Next, the process proceeds to step S3, in which an electrode body 150 is manufactured. More specifically, a separator 157 is provided between the positive electrode 155 manufactured as described above and a negative electrode 156 manufactured separately, and they are wound to obtain the electrode body 150. More specifically, a positive-electrode-mixture-layer uncoated part 155b of the positive electrode 155 and a negative-electrode-mixture-layer uncoated part 156b of the negative electrode 156 are placed on opposite sides to each other in a width direction (the right-left direction in FIGS. 2 to 4), and the positive electrode 155, the negative electrode 156, and the separator 157 are wound in a flat shape, so as to form the electrode body 150.

Then, the process proceeds to step S4, in which a nonaqueous electrolyte secondary battery 100 is assembled. More specifically, first, a positive terminal 120 is joined (welded) to the positive-electrode-mixture-layer uncoated part 155b of the electrode body 150. Further, a negative terminal 130 is joined (welded) to the negative-electrode-mixture-layer uncoated part 156b of the electrode body 150. Subsequently, as illustrated in FIG. 2, the electrode body 150 to which the positive terminal 120 and the negative terminal 130 are welded is placed in a receptacle portion 119 of a laminated film 101. Then, the laminated film 101 is folded at its folding position 110g, so as to accommodate the electrode body 150 therein.

After that, a welding sealing portion 115 is heated while being pressurized in its thickness direction, so that inner resin films 111 are welded thermally, and hereby, a battery case 110 is formed. Subsequently, a nonaqueous electrolyte 140 is poured into the battery case 110 via an injection opening (not shown) provided in the battery case 110, and after that, the injection opening is sealed. Thus, assembling of the nonaqueous electrolyte secondary battery 100 is completed.

Subsequently, the process proceeds to step S5, in which initial charge is performed on the nonaqueous electrolyte secondary battery 100 assembled as described above. More specifically, the nonaqueous electrolyte secondary battery 100 is charged until its SOC reaches 100%. By performing initial charge as such, an oxidation-reduction potential (an operation potential) of the positive-electrode active material 11 reaches 4.35 V (vs. Li/Li$^+$) or more. After that, predetermined processing is performed, so that the nonaqueous electrolyte secondary battery 100 is completed.

In the meantime, in the present embodiment, the positive electrode mixture paste 10 is formed by mixing the acid compound 15 ($H_3PO_4$) in addition to the positive-electrode active material 11 ($LiNi_{0.5}Mn_{1.5}O_4$), the conductive material 12 (acetylene black), the binder 13 (PVDF), the lithium phosphate 14, and the solvent 16 (NMP) in step S1 (a positive electrode mixture paste manufacturing step), as described above.

Thus, by adding the acid compound 15 as a material of the positive electrode mixture paste 10, at least part of the lithium phosphate 14 can be dissolved in the positive electrode mixture paste 10 by the acid compound 15. When at least part of the lithium phosphate 14 is dissolved in the positive electrode mixture paste 10 as such, good dispersibility of the lithium phosphate 14 in the positive electrode mixture paste 10 is obtained. That is, in comparison with a positive electrode mixture paste (e.g., a positive electrode mixture paste in JP 2014-103098 A) manufactured without adding the acid compound 15, the lithium phosphate 14 can be dispersed (dispersed uniformly with less unevenness) in the whole positive electrode mixture paste 10.

Hereby, a good dispersion degree of the lithium phosphate 14 can be achieved in the positive electrode mixture layer 152 formed by drying the positive electrode mixture paste 10. That is, in comparison with a positive electrode mixture layer (e.g., a positive electrode mixture layer in JP 2014-103098 A) manufactured without adding the acid compound 15, the lithium phosphate 14 can be dispersed (dispersed uniformly with less unevenness) in the whole positive electrode mixture layer 152.

Hereby, in the step (step S5) of performing initial charge on the nonaqueous electrolyte secondary battery 100, "when the potential of the positive-electrode active material 11 (equivalent to the potential of the positive electrode 155) reaches 4.35 V or more, so that the solvent (ethylene carbonate and the like) in the nonaqueous electrolyte 140 is decomposed by oxidation on a surface of the positive-electrode active material 11 and hydrogen ions generated hereby are reacted with fluorine ions in the nonaqueous electrolyte 140 so as to generate hydrofluoric acid (HF)," a probability that the hydrofluoric acid thus generated is reacted with the lithium phosphate 14 can be increased, thereby making it possible to effectively reduce the hydrofluoric acid thus generated. As a result, it is possible to reduce elution of transition metals (Mn) in the positive-electrode active material 11 due to an action of the hydrofluoric acid. Note that that some of the hydrofluoric acid thus generated which cannot be reacted with the lithium phosphate 14 on the surface of the positive-electrode active material 11 migrate to the negative electrode 156, and generate hydrogen gas ($H_2$).

Further, due to the reaction between the hydrofluoric acid and the lithium phosphate 14 on the surface of the positive-electrode active material 11, a protective coating (which is presumably a coating in which a compound having elemental fluorine is mixed with a compound having elemental phosphorus) is formed on the surface of the positive-electrode active material 11. In the present embodiment, a good dispersion degree of the lithium phosphate 14 in the positive electrode mixture layer 152 can be obtained, so that the protective coating is easily formed on the surface of each positive-electrode active material 11 in the positive electrode mixture layer 152. Since the protective surface film is formed, in a case where the nonaqueous electrolyte secondary battery 100 is charged subsequently until the potential of the positive-electrode active material 11 (equivalent to the potential of the positive electrode 155) reaches 4.35 V or more, it is possible to restrain the solvent of the nonaqueous electrolyte 140 from being decomposed by oxidation on the surface of the positive-electrode active material 11. Hereby, it is possible to restrain elution of transition metals (Mn) from the positive-electrode active material 11.

Besides, in the present embodiment, an acid compound (more specifically, phosphate) having elemental phosphorus (P) is used as the acid compound 15 to be mixed in the positive electrode mixture paste. Hereby, the acid compound 15 itself is reacted with hydrofluoric acid, so that the acid compound 15 can contribute to forming the protective surface film on the surface of the positive-electrode active material 11. Hereby, it is possible to further restrain the solvent of the nonaqueous electrolyte 140 from being decomposed by oxidation on the surface of the positive-electrode active material 11.

(Evaluation Test) Subsequently, a test to evaluate a dispersion degree of lithium phosphate in a positive electrode mixture layer was performed. More specifically, nonaqueous electrolyte secondary batteries of Comparative Embodiments 1, 2 were first assembled, in addition to the nonaqueous electrolyte secondary battery 100 of the present embodiment. In Comparative Embodiment 1, a positive electrode mixture paste was manufactured without adding the lithium phosphate 14 and the acid compound 15 (phosphoric acid), which is different from the present embodiment. After that, a nonaqueous electrolyte secondary battery was assembled in a similar manner to the present embodiment. In Comparative Embodiment 2, a positive electrode mixture paste was manufactured without adding only the acid compound 15 (phosphoric acid), which is different from the present embodiment. After that, a nonaqueous electrolyte secondary battery was assembled in a similar manner to the present embodiment.

Note that, in the present embodiment, an additive amount of the lithium phosphate 14 is 3.0 wt % relative to an additive amount of the positive-electrode active material 11. Further, an additive amount of the acid compound 15 (phosphoric acid) is 1.2 wt % relative to the additive amount of the positive-electrode active material 11 (see Table 1). In Comparative Embodiment 2, an additive amount of the lithium phosphate 14 is the same as in the present embodiment (see Table 1).

TABLE 1

| | Lithium Phosphate (wt %) | Phosphoric Acid (wt %) |
| --- | --- | --- |
| Comparative Embodiment 1 | 0 | 0 |
| Comparative Embodiment 2 | 3.0 | 0 |
| Embodiment | 3.0 | 1.2 |

After that, respective volumes (volumes before initial charge) of the nonaqueous electrolyte secondary batteries of the present embodiment and Comparative Embodiments 1, 2 were measured. Subsequently, initial charge was performed on the nonaqueous electrolyte secondary batteries of the present embodiment and Comparative Embodiments 1, 2. Note that a method of initial charge is the same as step S5 described above. After that, respective volumes (volumes after initial charge) of the nonaqueous electrolyte secondary batteries were measured. Then, in terms of each of the nonaqueous electrolyte secondary batteries, the volume before initial charge was subtracted from the volume after initial charge, so as to calculate a volume increasing amount due to initial charge.

Here, it can be considered that a volume increasing amount due to initial charge is equal to a gas generation amount due to initial charge. This is because each battery case was made of a laminated film, and when gas is generated in the battery case, a volume of the battery increases by just that much (just by a gas generation amount). On this account, the volume increasing amount due to initial charge was regarded as a gas generation amount due to initial charge, and a gas generation amount due to initial charge was found for each battery. Results thereof are illustrated in FIG. 7.

Note that it can be said that, as a gas generation amount due to initial charge is smaller, the battery has a high dispersion degree of lithium phosphate in the positive electrode mixture layer. The reason is as follows: the battery with a higher dispersion degree of lithium phosphate in the positive electrode mixture layer has a higher probability that hydrofluoric acid generated by performing initial charge (more specifically, the potential of the positive-electrode active material 11 reaches 4.35 V or more) is to be reacted with lithium phosphate, thereby making it possible to more effectively reduce the hydrofluoric acid thus generated. This makes it possible to further reduce such a reaction that fluorinated acid that cannot be reacted with lithium phosphate migrates to a negative electrode and generates hydrogen gas.

Figure 7:
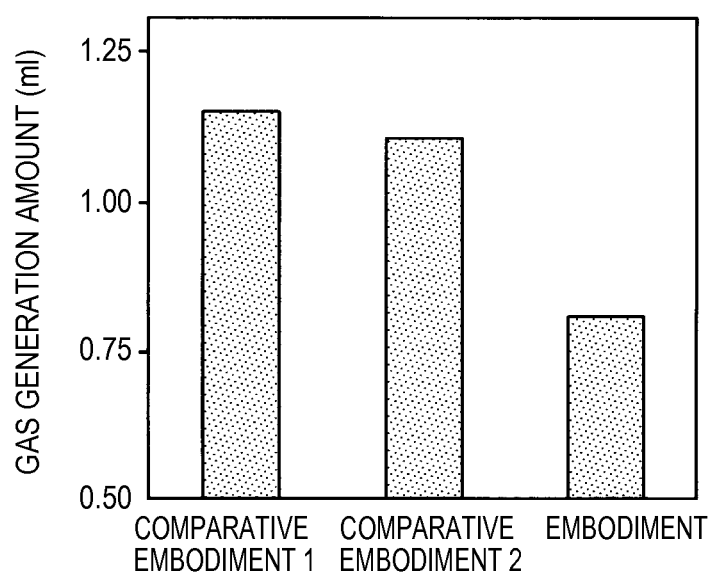
FIG. 7 is a view to compare a gas generation amount after initial charge.

In view of this, from consideration on the results of FIG. 7, it was found that the battery in Comparative Embodiment 1 had a largest gas generation amount (more specifically, a gas generation amount was 1.14 ml). The reason is presumably because no lithium phosphate 14 was contained in the positive electrode mixture paste (in the positive electrode mixture layer) in Comparative Embodiment 1, so that hydrofluoric acid generated by initial charge could not be caught by the lithium phosphate 14 (could not be reacted with the lithium phosphate 14), thereby resulting in that a large quantity of hydrogen gas was generated in the negative electrode.

Further, the battery in Comparative Embodiment 2 had a gas generation amount (more specifically, a gas generation amount was 1.10 ml) smaller than the battery of Comparative Embodiment 1. The reason is presumably because the lithium phosphate 14 was contained in the positive electrode mixture paste (in the positive electrode mixture layer) in Comparative Embodiment 2, so that hydrofluoric acid generated by initial charge could be partially caught by the lithium phosphate 14 (could be reacted with the lithium phosphate 14).

However, a reduction weight of the gas generation amount in the battery of Comparative Embodiment 2 relative to the battery of Comparative Embodiment 1 was very small. That is, the hydrofluoric acid generated by initial charge could not be more effectively caught by the lithium phosphate 14 (could not be reacted with the lithium phosphate 14). The reason is presumably because, in Comparative Embodiment 2, the positive electrode mixture paste was formed by kneading the positive-electrode active material 11 ($LiNi_{0.5}Mn_{1.5}O_4$), the conductive material 12 (acetylene black), the binder 13 (PVDF), the lithium phosphate 14, the solvent 16 (NMP), and the dispersing agent by the high-speed disperser 20, without adding the acid compound 15 (phosphoric acid). In such a method, it is considered that lithium phosphate was aggregated (or aggregated lithium phosphate was not separated), so that dispersibility of lithium phosphate in the positive electrode mixture paste was lowered, thereby resulting in that a dispersion degree of lithium phosphate in the positive electrode mixture layer was lowered.

In contrast, in the battery 100 of the present embodiment, a gas generation amount could be largely reduced in comparison with Comparative Embodiments 1, 2. More specifically, in the battery 100 of the present embodiment, a gas generation amount was 0.80 ml, and thus, the gas generation amount could be reduced by about 27% from the battery of Comparative Embodiment 2.

The reason is because, unlike Comparative Embodiment 2, the positive electrode mixture paste 10 was manufactured by adding the acid compound 15 ($H_3PO_4$) in the present embodiment. More specifically, by adding the acid compound 15 as a material of the positive electrode mixture paste 10, at least part of the lithium phosphate 14 could be dissolved in the positive electrode mixture paste 10 by the acid compound 15, thereby achieving good dispersibility of the lithium phosphate 14 in the positive electrode mixture paste 10. That is, in comparison with the positive electrode mixture paste of Comparative Embodiment 2 which was manufactured without adding the acid compound 15, the lithium phosphate 14 could be dispersed (dispersed uniformly with less unevenness) in the whole positive electrode mixture paste 10.

As a result, in the battery 100 of the present embodiment, it can be said that hydrofluoric acid generated on the surface of the positive-electrode active material due to initial charge was reacted with lithium phosphate with high probability, thereby making it possible to effectively reduce the hydrofluoric acid thus generated. Hereby, it can be said that such a reaction that fluorinated acid that cannot be reacted with lithium phosphate migrates to the negative electrode and generates hydrogen gas could be reduced effectively.

The present invention has been described above in line with the embodiment, but the present invention is not limited to the above embodiment and can be modified and applied appropriately without departing from the gist of the present invention.

What is claimed is:

1. A manufacturing method of a nonaqueous electrolyte secondary battery, the manufacturing method comprising:
   manufacturing a positive electrode mixture paste by kneading a positive-electrode active material having an operation upper limit potential of 4.35 V or more on a metallic lithium basis, a conductive material, a binder, lithium phosphate, a solvent, and an acid compound, wherein the positive-electrode active material is a lithium nickel manganese oxide having a spinel structure;
   manufacturing a positive electrode including a positive electrode mixture layer on a surface of a current collector member, by applying the positive electrode mixture paste to the surface of the current collector member and drying the positive electrode mixture paste;
   assembling the nonaqueous electrolyte secondary battery by accommodating, in a battery case, the positive electrode, a negative electrode, and a nonaqueous electrolyte containing a compound having fluorine element; and
   performing initial charge on the nonaqueous electrolyte secondary battery,
   wherein the lithium nickel manganese oxide having a spinel structure is $LiNi_{0.5}Mn_{1.5}O_4$, and
   when the positive electrode mixture paste is manufactured, the kneading is performed by a disperser at a rotation speed within a range of 2000 to 4000 rpm.

2. The manufacturing method according to claim 1, wherein
   the acid compound has elemental phosphorus.

3. The manufacturing method according to claim 2, wherein
   the acid compound is at least one selected from the group consisting of phosphoric acid, pyrophosphoric acid, and metaphosphoric acid.

4. A positive electrode mixture paste obtained by mixing a positive-electrode active material having an operation upper limit potential of 4.35 V or more on a metallic lithium basis, a conductive material, a binder, lithium phosphate, a solvent, and an acid compound, wherein the positive-electrode active material is a lithium nickel manganese oxide having a spinel structure, and the lithium nickel manganese oxide having a spinel structure is $LiNi_{0.5}Mn_{1.5}O_4$.

5. A positive electrode including a current collector member, and a positive electrode mixture layer obtained by drying a positive electrode mixture paste applied to the current collector member, wherein
   the positive electrode mixture paste is the positive electrode mixture paste according to claim 4.

6. A nonaqueous electrolyte secondary battery including a positive electrode, a negative electrode, and a nonaqueous electrolyte containing a compound having fluorine element, wherein
   the positive electrode is the positive electrode according to claim 5.

7. The manufacturing method according to claim 1, further comprising performing an initial charge on the nonaqueous electrolyte secondary battery such that a potential of the positive electrode reaches 4.35 V or more.

8. A manufacturing method of a nonaqueous electrolyte secondary battery, the manufacturing method comprising:
   manufacturing a positive electrode mixture paste by kneading a positive-electrode active material having an operation upper limit potential of 4.35 V or more on a metallic lithium basis, a conductive material, a binder, lithium phosphate, a solvent, and an acid compound, wherein the positive-electrode active material is a lithium nickel manganese oxide having a spinel structure;
   manufacturing a positive electrode including a positive electrode mixture layer on a surface of a current collector member, by applying the positive electrode mixture paste to the surface of the current collector member and drying the positive electrode mixture paste;
   assembling the nonaqueous electrolyte secondary battery by accommodating, in a battery case, the positive electrode, a negative electrode, and a nonaqueous electrolyte containing a compound having fluorine element; and
   performing initial charge on the nonaqueous electrolyte secondary battery,
   wherein the lithium nickel manganese oxide having a spinel structure is $LiNi_{0.5}Mn_{1.5}O_4$,
   the acid compound is at least one selected from the group consisting of pyrophosphoric acid and metaphosphoric acid, and
   when the positive electrode mixture paste is manufactured, the kneading is performed by a disperser at a rotation speed within a range of 2000 to 4000 rpm.

9. The positive electrode mixture paste according to claim 4, wherein the acid compound is at least one selected from the group consisting of pyrophosphoric acid and metaphosphoric acid.

* * * * *